United States Patent
Sonntag et al.

(10) Patent No.: US 7,545,886 B2
(45) Date of Patent: *Jun. 9, 2009

(54) METHOD AND APPARATUS FOR EYE-OPENING BASED OPTIMIZATION

(75) Inventors: Jeffrey Lee Sonntag, Portland, OR (US); John Theodore Stonick, Portland, OR (US); Daniel Keith Weinlader, Allentown, PA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/112,645

(22) Filed: Apr. 30, 2008

(65) Prior Publication Data
US 2008/0232520 A1    Sep. 25, 2008

Related U.S. Application Data

(63) Continuation of application No. 10/978,764, filed on Nov. 1, 2004, now Pat. No. 7,400,694.

(51) Int. Cl.
*H04L 27/00* (2006.01)
(52) U.S. Cl. .......... 375/316; 375/350; 375/349; 455/501; 455/63.1; 455/570; 455/296; 702/17; 702/69; 702/191; 708/300; 708/322; 708/323
(58) Field of Classification Search ............ 375/350, 375/316, 349; 708/300, 322, 323; 455/501, 455/63.1, 570, 296; 702/17, 69, 191
See application file for complete search history.

(56) References Cited

U.S. PATENT DOCUMENTS

| 4,507,795 | A  |   | 3/1985 | Wagner |
| 5,023,869 | A  | * | 6/1991 | Grover et al. ............ 370/421 |
| 7,194,155 | B1 | * | 3/2007 | Kahn et al. ................ 385/27 |
| 2003/0016605 | A1 | * | 1/2003 | Tateyama et al. ....... 369/47.26 |
| 2003/0081697 | A1 | * | 5/2003 | Little ........................ 375/317 |
| 2004/0041599 | A1 |   | 3/2004 | Murphy |

* cited by examiner

*Primary Examiner*—Mohammad H Ghayour
*Assistant Examiner*—Leila Malek
(74) *Attorney, Agent, or Firm*—Park, Vaughan & Fleming LLP

(57) ABSTRACT

An eye opening measurement technique, that does not interrupt a receiver's normal operation, is used as a metric for optimizing any selected parameters of the receiver's operation. If eye opening size decreases, as a result of a change to a receiver parameter, the polarity for stepwise changes is reversed such that the next change is in the opposite direction. Other types of search procedures can be used. Eye opening size is the difference between the eye's upper and lower edges. Measurement of eye opening size is accomplished using a data and auxiliary slicer that find each "edge" of an eye opening based upon the slicers' level of agreement. Depending upon the level of agreement, and whether symbols of the upper or lower region of the eye are counted, the threshold of the auxiliary slicer can be adjusted in the direction necessary to converge on the eye edge sought.

8 Claims, 10 Drawing Sheets

Figure 2A

```
1   /* SYMBOLIC DEFINITIONS FOLLOW */
2
3   /* number of times aux slicer adjusted to find an edge of eye */
4   #define NUM_OF_AUX_ADJS 500
5
6   /* number of symbols considered for each slicer adjustment */
7   #define NUM_SYMBOLS 1000
8
9   /* size, in units of 0.1 mV, of each adjustment to aux slicer's threshold */
10  #define AS_DELTA  10
11
12
13  /* GLOBAL VARIABLE DECLARATIONS FOLLOW */
14
15  /* the error slicer is set to whatever level this variable is set to */
16  int aux_slicer_thresh;
17
18  /* wait_for_symbol_clock sets data_slicer_value and aux_slicer_value
19  to the current values for, respectively, the data and auxiliary slicers */
20  int data_slicer_value;
21  int aux_slicer_value;
```

Figure 2B

```
1   measure_eye_opening( )
2   {
3
4   /* adjust aux slicer to edge of binary "1" region */
5   adjust_aux_slicer ( 1 );
6
7   /* level for aux slicer, found by above application of adjust_aux_slicer,
8   is saved  in signal_level1 */
9   signal_level1 = aux_slicer_thresh;
10
11  /* adjust aux slicer to edge of binary "0" region */
12  adjust_aux_slicer ( 0 );
13
14  eye_size = signal_level1 - aux_slicer_thresh;
15
16  /* value returned by measure_eye_opening is value of eye_size */
17  return eye_size;
18  }
```

Figure 2C

```
1   adjust_aux_slicer ( eye_region )
2   {
3
4      /* initialize threshold of auxiliary slicer */
5      aux_slicer_thresh = init_slicer_thresh;
6
7   /* following loop adjusts aux_slicer_thresh NUM_OF_AUX_ADJS times
8   to find edge of a data eye specified by eye_region. */
9   outer = 0;
10  while (outer < NUM_OF_AUX_ADJS)
11  {
12         /* initialize inner loop */
13         inner = 0;
14         num_of_diffs = 0;
15
16         /* each auxiliary slicer adjustment based on considering
17         NUM_SYMBOLS symbols */
18         while (inner < NUM_SYMBOLS)
19         {
20                wait_for_symbol_clock( );
21                if ( data_slicer_value == eye_region )
22                {
23                       /* current symbol is of region whose edge is sought */
24                       inner = inner + 1;
25                       if (data_slicer_value != aux_slicer_value)
26                              /* data and aux slicers disagree.  Count towards
27                              aux slicer possibly being outside of eye */
28                              num_of_diffs = num_of_diffs + 1;
29                }
30         } /* end inner loop */
31
32  /* procedure adjust_aux_slicer continued in Fig. 2D */
```

Figure 2D

```
1    if ( num_of_diffs < max_disagreements )
2    {
3            /* auxiliary slicer is within eye, move towards outside of eye */
4            if (eye_region == 1)
5                    /* since seeking edge of "1" region, adjust aux slicer up */
6                    aux_slicer_thresh = aux_slicer_thresh + AS_DELTA;
7            else /* eye_region == 0 */
8                    /* since seeking edge of "0" region, adjust aux slicer down */
9                    aux_slicer_thresh = aux_slicer_thresh - AS_DELTA;
10   }
11   else
12           /* auxiliary slicer is outside eye, move towards inside of eye */
13           if (eye_region == 1)
14                   /* since seeking to enter eye from "1" region, so adjust aux
15                      slicer down */
16                   aux_slicer_thresh = aux_slicer_thresh - AS_DELTA;
17           else /* eye_region == 0 */
18                   /* since seeking to enter eye from "0" region, so adjust aux
19                      slicer up */
20                   aux_slicer_thresh = aux_slicer_thresh + AS_DELTA;
21
22       outer=outer+1
23
24   } /* end outer loop */
25
26   } /* end adjust_aux_slicer */
```

Figure 3

```
1   /* set bandwidth of receive to an initial value */
2   receiver_bw = INITIAL_BW;
3
4   /* set stepwise for bandwidth adjustment to an initial polarity */
5   bw_delta = INITIAL_BW_DELTA;
6
7   /* initialize value of eye size for current receiver bandwidth */
8   last_eye_size = measure_eye_opening();
9
10  /* initialize continue_loop */
11  continue_loop = TRUE;
12
13  /* begin optimization loop.  Continue loop so long as variable
14  "continue_loop" is TRUE */
15  while (continue_loop)
16  {
17      /* set receiver to a stepwise-changed bandwidth value */
18      receiver_bw = receiver_bw + bw_delta;
19
20      /* obtain current value for eye size given latest stepwise bandwidth
21      change */
22      curr_eye_size = measure_eye_opening();
23
24      /* calculate how eye size changed given latest stepwise bandwidth
25      change */
26      eye_size_chng = curr_eye_size - last_eye_size;
27
28      /* since value of last_eye_size has been used, can be updated in
29      preparation for calculation of eye_size_chng */
30      last_eye_size = curr_eye_size;
31
32      /* if eye size increased, or stayed the same, then try another stepwise
33      change in same direction, so don't change bw_delta */
34
35      /* if eye size decreased then change polarity of next stepwise
36      change */
37      if (eye_size_chng < 0)
38          bw_delta = -bw_delta
39  } /*end while */
```

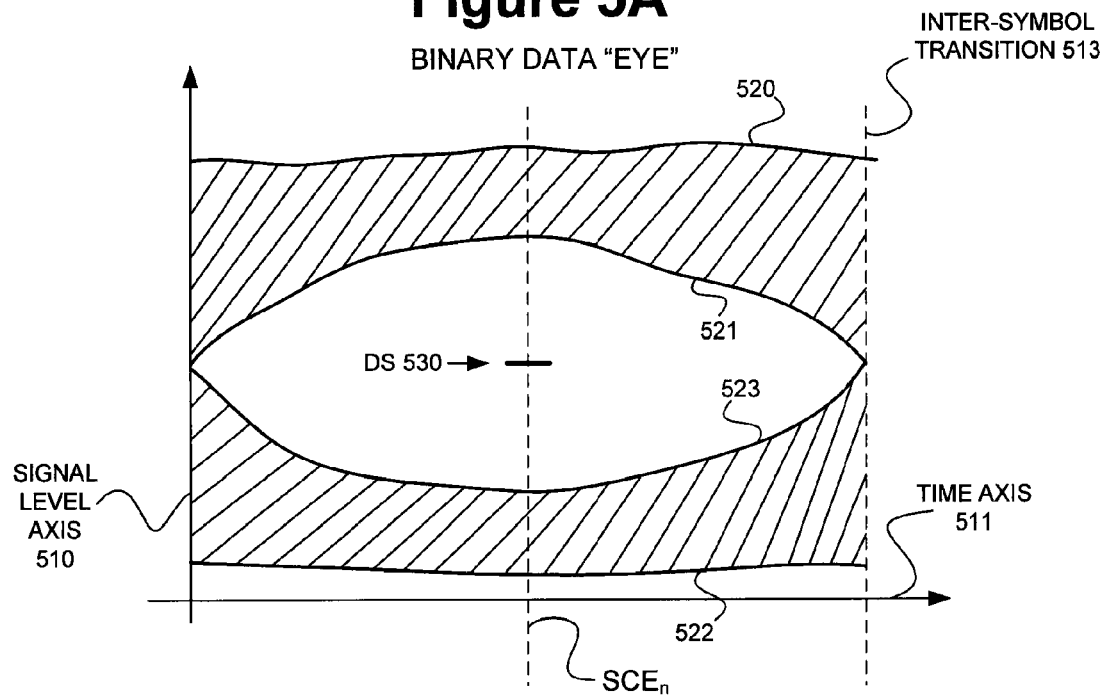
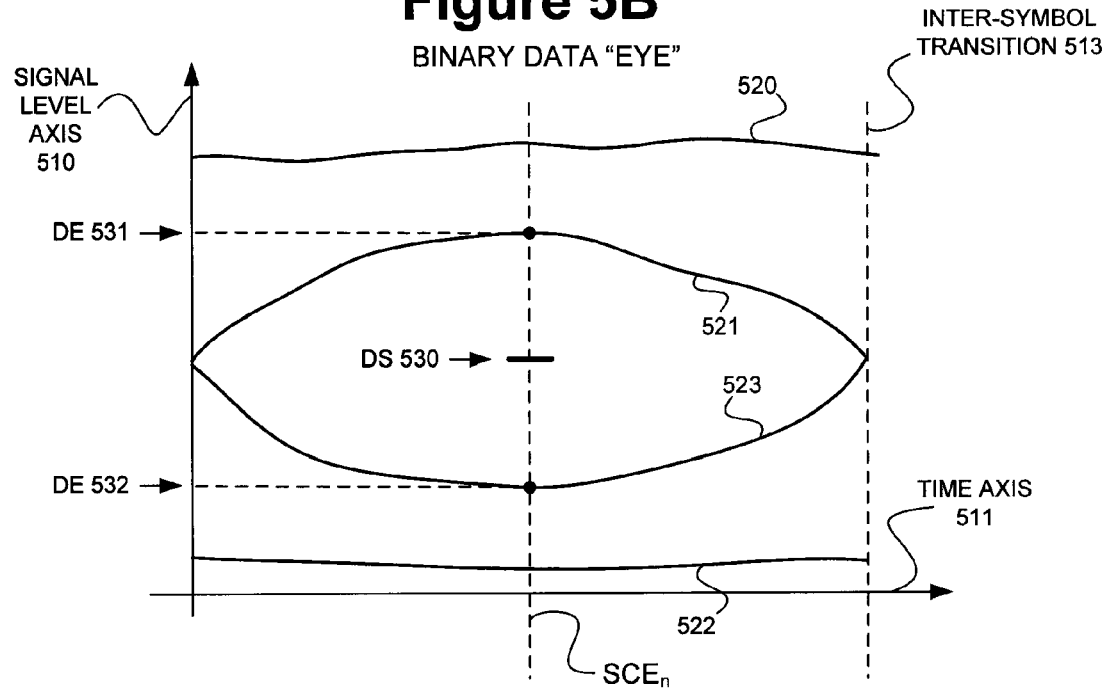

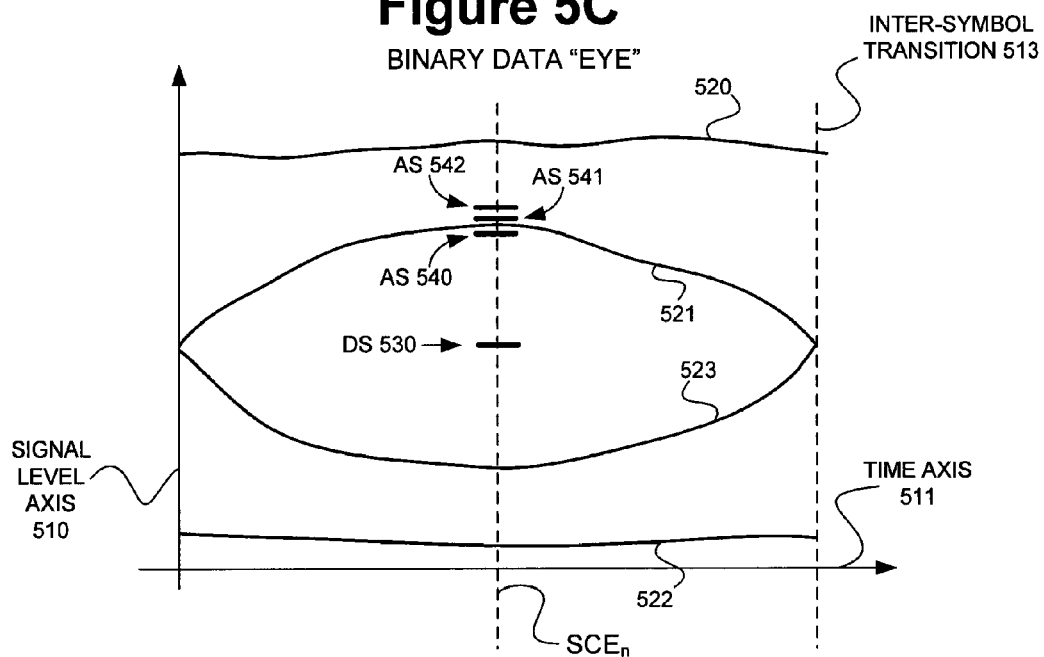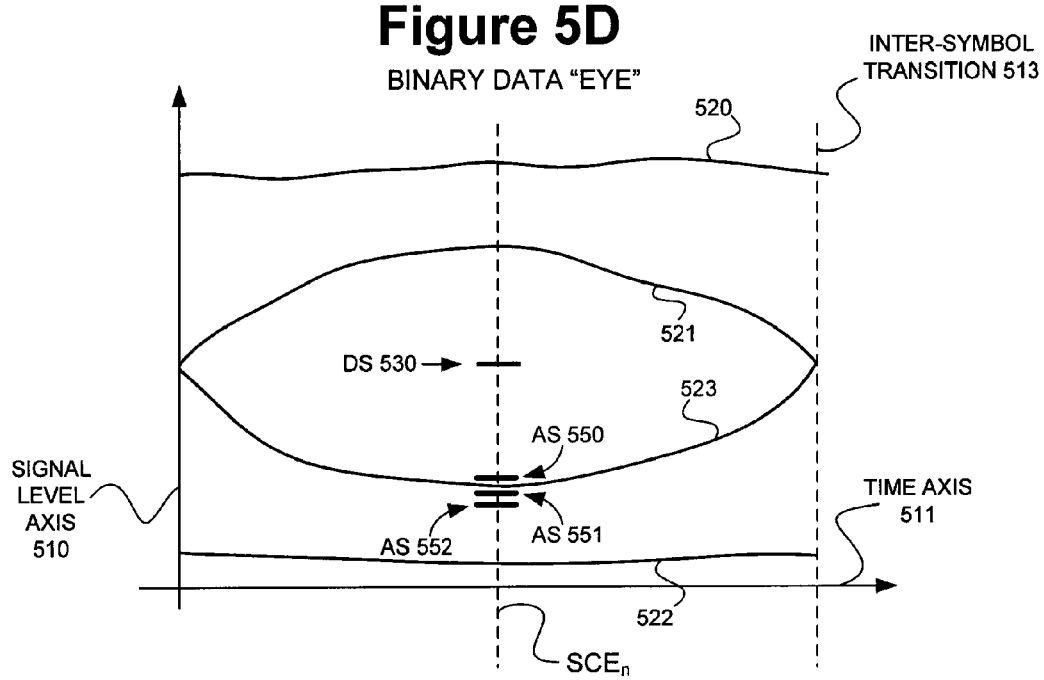

METHOD AND APPARATUS FOR EYE-OPENING BASED OPTIMIZATION

RELATED APPLICATION

This application is a continuation of, and hereby claims priority under 35 U.S.C. § 120 to, U.S. patent application Ser. No. 10/978,764, entitled "Method and Apparatus For Eye Opening-Based Optimization," by the same inventors as the instant application, and filed on 1 Nov. 2004.

FIELD

The present invention relates generally to techniques for optimizing receivers in a data transmission system.

BACKGROUND

In the operation of receivers, as part of a data transmission system (DTS), it can be desirable to incorporate optimization procedures that modify certain parameters of the receiver.

One approach, is to adjust receiver parameters according to a cost function that measures some type of error. Example cost functions are minimum energy or min-max. Such cost functions can be shown to be effective with respect to a particular type of statistical noise model and a given set of environmental conditions. However, in "real world" situations, involving actual DTS equipment, noise disturbances can come from multiple types of sources, with each source having very different characteristics. Within a single piece of DTS equipment, that serves multiple data links, noise characteristics can vary widely across the links. Also, the noise characteristics of a single link, within a multi-link piece of DTS equipment, can vary based upon whether adjacent links (or channels) are operational. Thus, selecting a particular cost function, by which to optimize the parameters of a piece of DTS equipment, does not necessarily yield, on a consistent basis, the best improvement in a receiver's bit error rate.

Another approach is to minimize a cost function based on the bit error rate itself. However, this type of cost function cannot usually be expressed in a closed form that would make it tractable.

Thus, there is a need to develop optimization techniques, for adjusting parameters of receivers, that operate, across varying noise and environmental characteristics, with more uniform effectiveness.

SUMMARY

The performance of a DTS receiver can be measured by the size of its "eye openings." A definition of eye opening size is presented.

The measurement of eye opening size can be accomplished, without interrupting the normal operation of a receiver in a DTS, by utilizing two types of slicers: a data slicer and an auxiliary slicer. Measurement of eye opening size, using these two types of slicers, is discussed.

Once an eye opening measurement technique is available, that can measure a receiver's eye opening size without interrupting its normal operation, it can be used as a cost function (or metric) for optimizing any selected parameter, or parameters, of the receiver's operation.

Example pseudocode, for using an eye opening size metric to adjust a receiver's bandwidth, is presented.

The pseudocode includes an optimization loop that incrementally changes a receiver's bandwidth.

If eye opening size decreases, as a result of a change to the receiver's bandwidth, then the polarity of the stepwise change is reversed such that the next change to receiver bandwidth will be in the opposite direction.

Other types of search procedures can be used. For example, search procedures can be used that continue in a particular direction of parametric adjustment even if one or more steps of adjustment temporarily produce a decrease in eye opening size. Such search procedures can therefore avoid a localized minima.

While the examples discussed herein are primarily oriented towards binary data streams, the techniques presented are applicable to any type of symbol stream. Applicability to PAM4 data receivers is discussed.

The definition of eye opening size used herein (applicable to binary and non-binary data eyes) is based on the following definitions for the upper and lower edges of an eye.

The "edge" of an eye is defined in terms of a level of agreement between a data slicer and an auxiliary slicer.

A data slicer compares an input signal level to a threshold for purposes of identifying symbols of a data transmission stream. When used with a binary data stream, the data slicer can output either a one or a zero.

The auxiliary slicer operates in the same way as the data slicer, except its threshold is adjustable.

When the threshold of the auxiliary slicer is "inside" the eye, the data slicer and the auxiliary slicer always agree.

If the auxiliary slicer's threshold moves into the upper or lower region of a data eye, however, there will be traces where the two slicers disagree. If, for example, the auxiliary slicer's threshold sufficiently increased, such that it enters the region of a data eye's upper symbol, there are some traces of the upper symbol that will pass below the auxiliary slicer's threshold and be identified as the lower symbol. If the auxiliary slicer's threshold is still further increased into the upper region, there are even more traces, identified as upper symbols by the data slicer, that will pass below the auxiliary slicer's threshold.

The level of disagreement between the data and auxiliary slicers can be quantified as follows. A certain number of symbols, defined as NUM_SYMBOLS, can be counted if they belong to the region of the eye whose edge is sought. If the number of disagreements between the data and auxiliary slicers, referred to herein as "num_of_diffs," is below a certain level, referred to herein as "max_disagreements," then the auxiliary slicer is "inside" the eye. If, however, num_of_diffs is greater than, or equal to, max_disagreements, the auxiliary slicer is "outside" the eye.

Eye opening size can be measured as follows.

The overall strategy is as follows: locate the upper edge of the eye (according to max_disagreements), locate the lower edge of the eye (also according to max_disagreements) and determine the difference between the two values. Each edge of the eye can be located as described below. A pseudocoded version of a procedure, for eye opening size measurement, is described.

A region of a data eye, whose edge is to be located, is selected.

Next, NUM_SYMBOLS symbols, that are actually part of the selected region as determined by the data eye's data slicer, are counted. For each of the NUM_SYMBOLS symbols, if the auxiliary slicer disagrees with the data slicer, num_of_diffs is incremented.

After NUM_SYMBOLS symbols have been counted, num_of_diffs is compared with max_disagreements. Depending upon the results of the comparison, and depending upon whether symbols of the upper or lower region of the eye were counted, the threshold of the auxiliary slicer can be adjusted in the necessary direction. The magnitude of each adjustment to the auxiliary slicer's threshold can be an amount referred to herein as AS_DELTA.

If the above process is repeated a sufficient number of times, where each repetition adjusts the auxiliary slicer's threshold by AS_DELTA, the desired eye opening edge will be located. The total number of adjustments to the auxiliary slicer's threshold can be a fixed amount, referred to herein as NUM_OF_AUX_ADJS.

The magnitude of AS_DELTA need not be fixed, but can be a function of the state of the edge search process.

A pseudocoded procedure for measuring eye opening size, called "measure_eye_opening," is presented.

An example hardware implementation for measuring eye opening size is depicted. The implementation shows a slicing and measuring unit 140 that can be incorporated as part of an adaptive receiver in a data transmission system. Slicing and measuring unit 140 comprises a data slicer 110 and an auxiliary slicer 111. Slicing and measuring unit 140 also comprises a statistical engine 130 and eye measurement unit 133.

An example hardware implementation for an adaptive receiver is also shown. The example receiver incorporates slicing and measuring unit 140 along with an optimization unit 211 (for performing a search procedure) and an adjustable bandwidth unit 210 (to provide an example adjustable parameter).

Example functionality for hardware components is presented in terms of corresponding pseudocode. Alternatives, between having certain hardware components integrated on the same integrated circuit, or implemented separately, are discussed.

DESCRIPTION OF THE DRAWINGS

The accompanying drawings, that are incorporated in and constitute a part of this specification, illustrate several embodiments of the invention and, together with the description, serve to explain the principles of the invention:

FIG. 2A contains definitions for various symbolic constants and presents declarations for various global variables.

FIG. 2B presents a pseudocoded procedure called measure_eye_opening.

FIGS. 2C-2D presents a pseudocoded procedure called adjust_aux_slicer.

FIG. 3 depicts an example use, written in pseudocode, of an eye opening size metric.

FIGS. 5A-5B show an example "data eye" where the symbol stream is binary.

FIGS. 5C-5D are the same as FIG. 5B, except certain additional levels, that the auxiliary slicer can be set to, are shown.

DETAILED DESCRIPTION

Figure 1A:
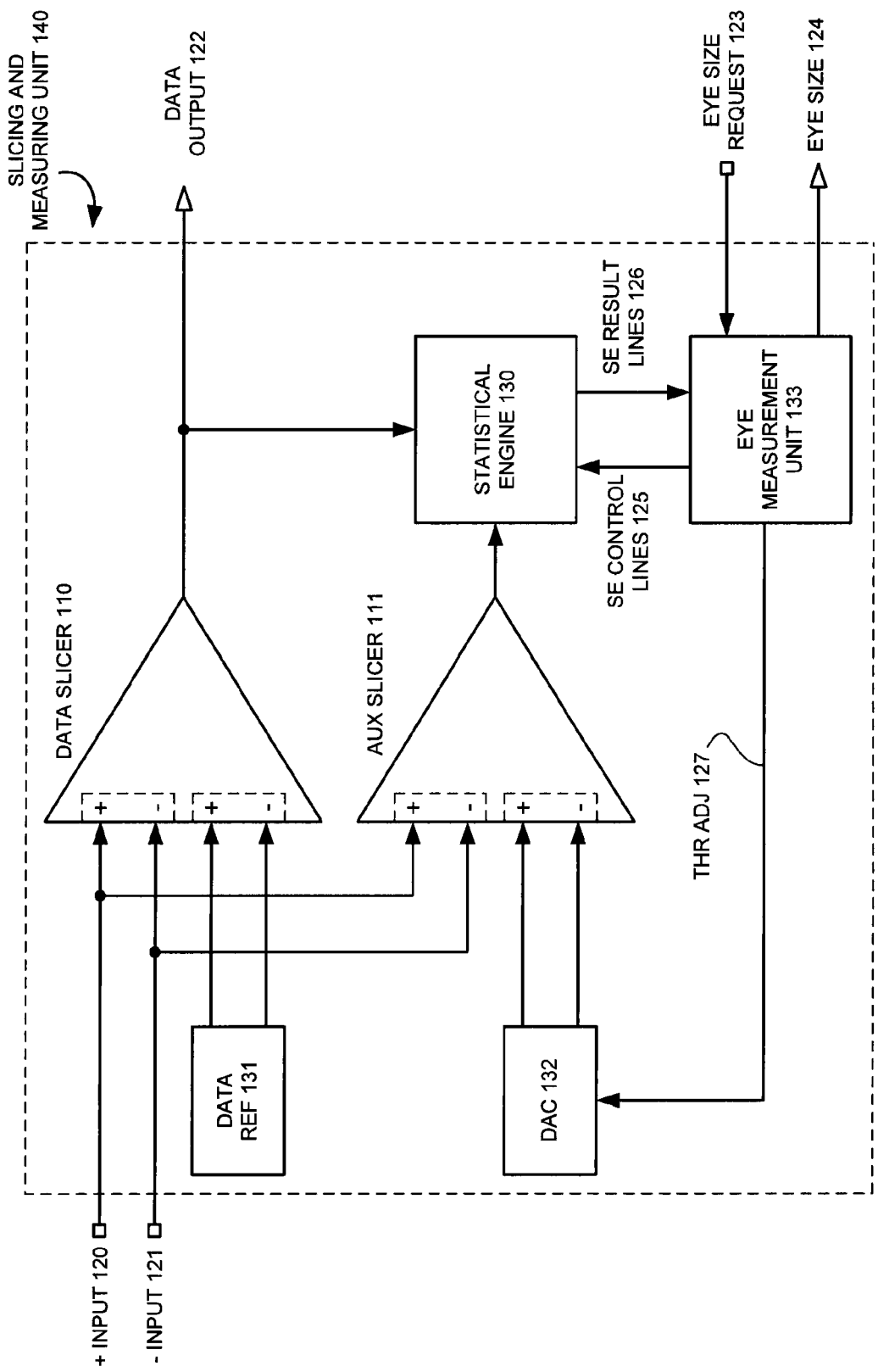
FIG. 1A shows a slicing and measuring unit 140 that can be incorporated as part of a receiver in a data transmission system.

Reference will now be made in detail to preferred embodiments of the invention, examples of which are illustrated in the accompanying drawings. Wherever possible, the same reference numbers will be used throughout the drawings to refer to the same or like parts.

1. Overview

The performance of a DTS receiver can be measured by the size of its "eye openings." Eye opening size is defined in the below section 2: "Eye Opening Size."

The measurement of eye opening size can be accomplished, without interrupting the normal operation of a receiver in a DTS, by utilizing two types of slicers: a data slicer and an auxiliary slicer. Measurement of eye opening size, using these two types of slicers, is discussed in the below section 3: "Eye Opening Measurement."

Once an eye opening measurement technique is available, that can measure a receiver's eye opening size without interrupting its normal operation, it can be used as a cost function (or metric) for optimizing any selected parameter, or parameters, of the receiver's operation.

FIG. 3 depicts an example use, written in pseudocode, of an eye opening size metric. The example of FIG. 3 is written adjusting the bandwidth of a receiver, but any other parameter, or parameters, of a receiver could be substituted.

The receiver bandwidth parameter presented in FIG. 3 can result from adding an adjustable LPF to a receiver's input. As the cutoff frequency of the LPF is increased, the bandwidth, that can be input to the receiver, is also increased. The LPF is controlled by to whatever value is assigned to the variable "receiver_bw." receiver_bw is first set to an initial value (FIG. 3, line 2). The amount of each stepwise change to receiver_bw is determined by the value of the variable "bw_delta." bw_delta is first set to an initial value (FIG. 3, line 5).

Eye opening size of the receiver is measured with each call to the procedure "measure_eye_opening," which returns a value equal to the size of at least one eye opening. An initial call to measure_eye_opening (line 8) is used to initialize the variable "last_eye_size" with the current eye opening size at the receiver, resulting from the initial setting of receiver_bw. Whether eye opening size has increased, as a result of the last parametric change, is measured in FIG. 3 by taking the difference of curr_eye_size and last_eye_size (line 26).

The starting of an optimization loop is prepared for by initializing the variable "continue_loop" to TRUE (line 11). An optimization loop is then begun (at line 15) that continues until the variable "continue_loop" is set FALSE. The setting of continue_loop to FALSE can be done by another process, not shown in FIG. 3. The steps of the optimization loop (see lines 17-38) are as follows.

receiver_bw is incremented (line 18).

curr_eye_size is loaded with the new eye opening size resulting from the latest receiver_bw change (line 22), and the resulting stepwise change in eye opening size is stored in eye_size_chng (line 26).

In preparation for another iteration, last_eye_size is updated with the value of curr_eye_size (line 30).

If eye opening size decreased as a result of the last change to receiver_bw, then the polarity of the stepwise change is reversed such that the next change to receiver_bw will be in the opposite direction. This functionality is implemented in FIG. 3 by lines 37-38: if eye_size_chng is less than zero (tested for by line 37), eye opening size has decreased. In case of a decrease, the polarity of bw_delta is reversed (by line 38).

While the examples discussed herein are primarily oriented towards binary data streams that produce only one data eye, the techniques presented are applicable to any type of symbol stream.

For example, for a PAM4 symbol stream, represented by a differential signal, the ideal signal levels used can be represented as: +3, +1, −1, −3. The signal levels +3, +1, −1, −3 can represent (are mapped to), respectively, the following 2-bit binary values: 11, 10, 01, 00. Between the four signal levels are three data eyes, each of which can have its own data slicer, with their thresholds set at: +2, 0, −2.

In terms of using the sizes of the three PAM4 data eyes for receiver optimization, there are several possibilities. The sizes of all three data eyes could be considered, in parallel, as the basis for a metric. Alternatively, the data eyes could be considered in a serial fashion, with only one data eye at a time forming the basis for a metric. Further, while three data eyes are available, it is possible to only use one of them as the basis for a metric. This approach can be used, for example, if all three data eyes are expected to be very similar or if one of the eyes is expected to be smallest (dominant).

In terms of a search procedure, to be used in conjunction with an eye opening based metric for optimizing certain receiver parameters, any type of search approach can be used. For example, the search procedure of FIG. 3 only continues in a particular direction of parametric adjustment so long as each stepwise change produces, at worst, no improvement in eye size. Other search procedures can, for example, continue in a particular direction of parametric adjustment, even if one or more steps of adjustment temporarily produce a decrease in eye opening size. Such search procedures can therefore avoid a localized minima, in search of a more global optimization.

2. Eye Opening Size

FIG. 5A shows an example "data eye" where the symbol stream is binary. A data eye of this type can be produced, for example, with a DSO. The temporal extent of the data eye is that of a single binary symbol with the center of the data eye being the time point at which any binary symbol $D_n$ is sampled, by an $SCE_n$, to determine its data content.

The data eye has a binary one region which, in general, is any signal trace above level DS 530 as of the time of $SCE_n$. In FIG. 5A, all traces above level DS 530 are depicted as being further limited to being between traces 520 and 521. The binary zero region of the data eye is, in general, any signal trace below level DS 530 as of the time of $SCE_n$. In FIG. 5A, all traces below level DS 530 are depicted as being further limited to being between traces 522 and 523. These regions are due to inter-symbol interference as well as other noise sources. The binary one region includes all traces for which a binary "1" is received, while the binary zero region includes all traces for which a binary "0" is received.

Level DS 530, of FIG. 5A, indicates the threshold of a data slicer at the time of $SCE_n$. A data slicer whose threshold is set to level DS 530 correctly determines whether a symbol is a "1" or a "0" since traces that transmit a binary "1" are above level DS 530 and traces that transmit a binary "0" are below level DS 530.

FIG. 5B is the same as FIG. 5A, except the cross-hatching, between traces 520 and 521 and between traces 522 and 523, has been removed from FIG. 5B. The cross-hatching of FIG. 5A is there to emphasize the region of binary one traces between 520 and 521 and the region of binary zero traces between 522 and 523.

One definition of eye opening size, applicable to binary and non-binary data eyes, is as follows. It is the difference between a selected lowest signal trace of the eye's upper region (e.g., the binary one region for a binary data eye) and a selected highest signal trace of the eye's lower region (e.g., the binary zero region for a binary data eye), as measured at time $SCE_n$.

For example, if the lowest signal trace of the binary one region is chosen to be 521 of FIG. 5B, and the highest signal trace of the binary zero region is chosen to be 523, then the size of the data eye is the difference between the signal levels DE 531 and DE 532.

A problem with the above definition of eye opening size, however, is selecting a lowest trace of the upper region, to define an upper edge of the eye, and a highest trace of the lower region, to define a lower edge of the eye.

The definition of eye opening size used herein (applicable to binary and non-binary data eyes) is based on the following definitions for the upper and lower edges of an eye.

The "edge" of an eye is defined in terms of a level of agreement between the data slicer and an auxiliary slicer. The auxiliary slicer operates in the same way as the data slicer described above, except its threshold is adjustable.

When the threshold of the auxiliary slicer is "inside" the eye (less than DE 531 and greater than DE 532), the data slicer and the auxiliary slicer always agree. For example, if the data and auxiliary slicers are both set to the level DS 530, as shown in FIG. 5B, then they will always produce the same value.

As the auxiliary slicer's threshold moves closer to the upper or lower region, however, the likelihood the two slicers will disagree increases. FIGS. 5C and 5D illustrate this. FIGS. 5C and 5D are the same as FIG. 5B, except certain additional levels, that the auxiliary slicer can be set to, are shown. In FIG. 5C, for example, if the auxiliary slicer is set to level AS 540, it will still always agree with the data slicer (even though the auxiliary slicer's threshold is greater than the data slicer's DS 530 setting). However, if the auxiliary slicer's threshold is further increased, to level AS 541 for example, there are some traces of the binary one region (such as trace 521) that will pass below the auxiliary slicer's threshold and be identified as binary zeros. If the auxiliary slicer's threshold is increased from level AS 541 to AS 542, there are even more traces, identified as binary ones by the data slicer, that will pass below the auxiliary slicer's threshold.

The level of disagreement between the data and auxiliary slicers can be quantified as follows. A certain number of symbols, defined as NUM_SYMBOLS, can be counted if they belong to the region of the eye whose edge is sought. If the number of disagreements between the data and auxiliary slicers, referred to herein as "num_of_diffs," is below a certain level, referred to herein as "max_disagreements," then the auxiliary slicer is "inside" the eye. If, however, num_of_diffs is greater than, or equal to, max_disagreements, the auxiliary slicer is "outside" the eye.

While the description herein focuses upon a definition of being "inside" the eye when num_of_diffs is less than max_disagreements, one could also define the inside of the eye to be when num_of_diffs is less than or equal to max_disagreements (in which case, when num_of_diffs is greater than max_disagreements, the auxiliary slicer is "outside" the eye).

The value for max_disagreements can also be expressed as a percentage of NUM_SYMBOLS. An example percentage of NUM_SYMBOLS, to use as the edge of an eye, is one percent. If NUM_SYMBOLS is 1000, for example, then a "one percent" eye edge implies setting max_disagreements at 10. This means there can be up to 10 disagreements between the data and auxiliary slicer, among 1000 symbols that are in fact part of the region whose edge is being measured, and still be considered "inside" the eye.

3. Eye Opening Measurement

Eye opening size can be measured as follows. Regardless of whether a symbol stream produces one data eye or several, the following approach is applicable to measuring any of its data eyes.

The overall strategy is as follows: locate the upper edge of the eye (according to max_disagreements), locate the lower edge of the eye (also according to max_disagreements) and determine the difference between the two values. Each edge of the eye can be located as described in the following section 3.1: "Eye Edge Location." A pseudocoded version of eye opening size measurement is described in the following section 3.2: "Pseudocode For Eye Opening Measurement."

An example eye opening measurement, for a binary data eye, is shown in FIGS. 5C and 5D.

Application of the procedure for eye edge location, described in the below section 3.1, "Eye Edge Location," to finding the upper edge of the eye, can lead to the auxiliary slicer being alternately set to the levels AS 541 and AS 542 (assume this is a minimum step size for the slicer), if the condition num_of_diffs less than max_disagreements is true at AS 541, but such condition is not true when the auxiliary slicer is set to AS 542. In this case, the eye edge location procedure can return either AS 541 or AS 542 as the upper edge of the eye.

Similarly, application of the procedure for eye edge location, to finding the lower edge of the eye, can lead to the auxiliary slicer being alternately set to the levels AS 551 and AS 552 (assume this is a minimum step size for the slicer), if the condition num_of_diffs less than max_disagreements is true at AS 551, but such condition is not true when the auxiliary slicer is set to AS 552. In this case, the eye edge location procedure can return either AS 551 or AS 552 as the lower edge of the eye.

The eye opening size, of the data eye shown in FIGS. 5C and 5D, can be the difference between any one of the following four pairs of signal levels: (AS 541, AS 551), (AS 541, AS 552), (AS 542, AS 551), (AS 542, AS 552). However, in practice, one would typically want consistency of the edge definition. Examples of consistent edge definition would be to choose either (AS 541, AS 551), which are the slicer levels furthest from DS 530 that return less than max_disagreements, or (AS 542, AS 552) which are the slicer levels closest to DS 530 that return greater than or equal to max_disagreements.

3.1. Eye Edge Location

A region of a data eye, whose edge is to be located, is selected. If the upper region of the eye is selected then the upper edge of the eye will be located, while if the lower region of the eye is selected then the lower edge of the eye will be located.

Next, a number of symbols, that are actually part of the selected region as determined by the data eye's data slicer, are counted. As discussed above, this number of symbols is referred to as NUM_SYMBOLS. For each of the NUM_SYMBOLS symbols, if the auxiliary slicer disagrees with the data slicer, a disagreement count, referred to herein as "num_of_diffs," is incremented.

After NUM_SYMBOLS symbols have been counted, num_of_diffs is compared with max_disagreements. If num_of_diffs is less than max_disagreements, the auxiliary slicer is within the eye opening. If num_of_diffs is equal to, or greater than, max_disagreements, the auxiliary slicer is outside the eye opening.

The result of the num_of_diffs to max_disagreements comparison can be used as follows to converge on the desired eye edge. Depending upon the results of the comparison, and depending upon whether symbols of the upper or lower region of the eye were counted, the threshold of the auxiliary slicer can be adjusted in the necessary direction. The magnitude of each adjustment to the auxiliary slicer's threshold can be an amount referred to herein as AS_DELTA.

If symbols of the upper region of the eye were counted, the results of the comparison can be used as follows. If num_of_diffs is less than max_disagreements, the threshold of the auxiliary slicer is increased (moved further from DS 530) by AS_DELTA. If num_of_diffs is greater than max_disagreements, the threshold of the auxiliary slicer is decreased (moved closer to DS 530) by AS_DELTA.

If symbols of the lower region of the eye were counted, the results of the comparison can be used as follows. If num_of_diffs is less than max_disagreements, the threshold of the auxiliary slicer is decreased (moved further from DS 530) by AS_DELTA. If num_of_diffs is greater than max_disagreements, the threshold of the auxiliary slicer is increased (moved closer to DS 530) by AS_DELTA.

If the above described process, by which the auxiliary slicer's threshold is adjusted by AS_DELTA, is repeated a sufficient number of times, the desired eye opening edge will be located. When the desired eye-opening edge is located, successive adjustments to the auxiliary slicer's threshold will tend to alternate between decreasing and increasing the threshold. The total number of adjustments to the auxiliary slicer's threshold can be a fixed amount, referred to herein as NUM_OF_AUX_ADJS.

The number of adjustments to the auxiliary slicer's threshold, needed for convergence upon the desired eye edge, depends upon the size of the eye opening and the size of AS_DELTA. Larger values of AS_DELTA will converge more quickly, but provide a less accurate result.

Further, the magnitude of AS_DELTA need not be fixed, but can be a function of the state of the edge search process.

3.2. Pseudocode for Eye Opening Measurement

Eye opening size can be measured by a pseudocoded procedure called "measure_eye_opening," shown in FIG. 2B.

FIG. 2A contains definitions for various symbolic constants using the "#define" command of the C programming language's preprocessor. Each #define associates a symbolic name with a value. For example, the first #define (see line 4) associates the symbolic name "NUM_OF_AUX_ADJS" with the number "500." In the following pseudocode, of FIGS. 2B to 2D, wherever the string "NUM_OF_AUX_ADJS" appears, the value "500" is substituted prior to any "execution" of the pseudocode. The particular constant values assigned in FIG. 2A are for purposes of example only. FIG. 2A also presents declarations for various global variables that are used in the following pseudocode of FIGS. 2B to 2D.

measure_eye_opening uses a procedure called "adjust_aux_slicer" twice, to find the upper and lower edges of an eye. The parameter passed to adjust_aux_slicer determines which edge of the eye it locates. If adjust_aux_slicer is called with the parameter "1" (see FIG. 2B, line 5), it locates the edge of the binary one region. If adjust_aux_slicer is called with the parameter "0" (see FIG. 2B, line 12), it locates the edge of the binary zero region. A call to adjust_aux_slicer results in setting the global variable "aux_slicer_thresh" (defined in FIG. 2A, line 16). The auxiliary slicer is set to the threshold assigned to aux_slicer_thresh.

The result of finding the edge of the binary one region is stored in the variable "signal_level1" (FIG. 2B, line 9) and the result of finding the edge of the binary zero region is implicitly left in the variable "aux_slicer_thresh." The eye opening size is the difference between signal_level1 and aux_slicer_thresh (line 14) and that difference is returned as the value of the measure_eye_opening procedure (line 17).

adjust_aux_slicer operates as follows, and is illustrated by the pseudocode of FIGS. 2C and 2D.

adjust_aux_slicer begins by initializing aux_slicer_thresh to an appropriate initial value (FIG. 2C, line 5). The initial value can be the same threshold as the data slicer. When adjust_aux_slicer has already found the edge of an eye region, however, and the edge of that region is requested again, an appropriate starting threshold can be the edge of the region as previously found.

adjust_aux_slicer then begins an outer loop that determines the number of times aux_slicer_thresh will be adjusted (FIG. 2C, line 10). The number of adjustments to aux_slicer_thresh is determined by NUM_OF_AUX_ADJS. NUM_OF_AUX_ADJS can be set to 500 (see FIG. 2A, line 4).

adjust_aux_slicer then begins an inner loop (FIG. 2C, line 18) that determines the number of symbols, of a region of a data eye, that are considered in deciding the auxiliary slicer's current location with respect that region's edge. The number of symbols considered is determined by NUM_SYMBOLS. NUM_SYMBOLS can be set to 1000 (see FIG. 2A, line 7). Each iteration of the inner loop performs the following steps.

wait_for_symbol_clock (line 20) waits for a symbol clock and then sets the global variables data_slicer_value and aux_slicer_value to, respectively, the outputs of the data and auxiliary slicers as of the symbol clock. Global variables data_slicer_value and aux_slicer_value are defined in FIG. 2A, lines 20 and 21.

A test of the data slicer is performed (see "if" statement, FIG. 2C, line 21) to determine whether the latest symbol captured by wait_for_symbol_clock is of the eye region whose edge is sought. If the latest symbol is of the desired region, then it is counted (line 24) towards the total number of symbols considered, referred to herein as NUM_SYMBOLS, for each adjustment to the auxiliary slicer's threshold. Also, a test of the auxiliary slicer is performed (see "if" statement, FIG. 2C, line 25) to determine whether the auxiliary slicer detected the same symbol as detected by the data slicer. If the auxiliary and data slicers disagree, the disagreement count ("num_of_diffs") is incremented (line 28).

The outer loop of adjust_aux_slicer can then pursue one of two main courses of action, depending upon whether the maximum number of permitted disagreements (referred to as "max_disagreements") is exceeded (see FIG. 2D, lines 1-20).

If max_disagreements is not exceeded, the auxiliary slicer is within the eye opening and its threshold is adjusted accordingly (see lines 4-9 of FIG. 2D) in order to move it closer to the desired eye opening edge.

If max_disagreements is equaled, or exceeded, by num_of_diffs, then the auxiliary slicer is outside the eye opening and its threshold is adjusted accordingly (see lines 13-20) in order to move it closer to the desired eye opening edge.

The magnitude of each auxiliary slicer adjustment is determined by the value of AS_DELTA. For purposes of example, AS_DELTA has been set to a magnitude of 1 mV (expressed in units of 0.1 mV). However this value is merely exemplary and other kinds of values, including time-varying and proportional values, can be used.

4. Hardware Implementation

Figure 4:
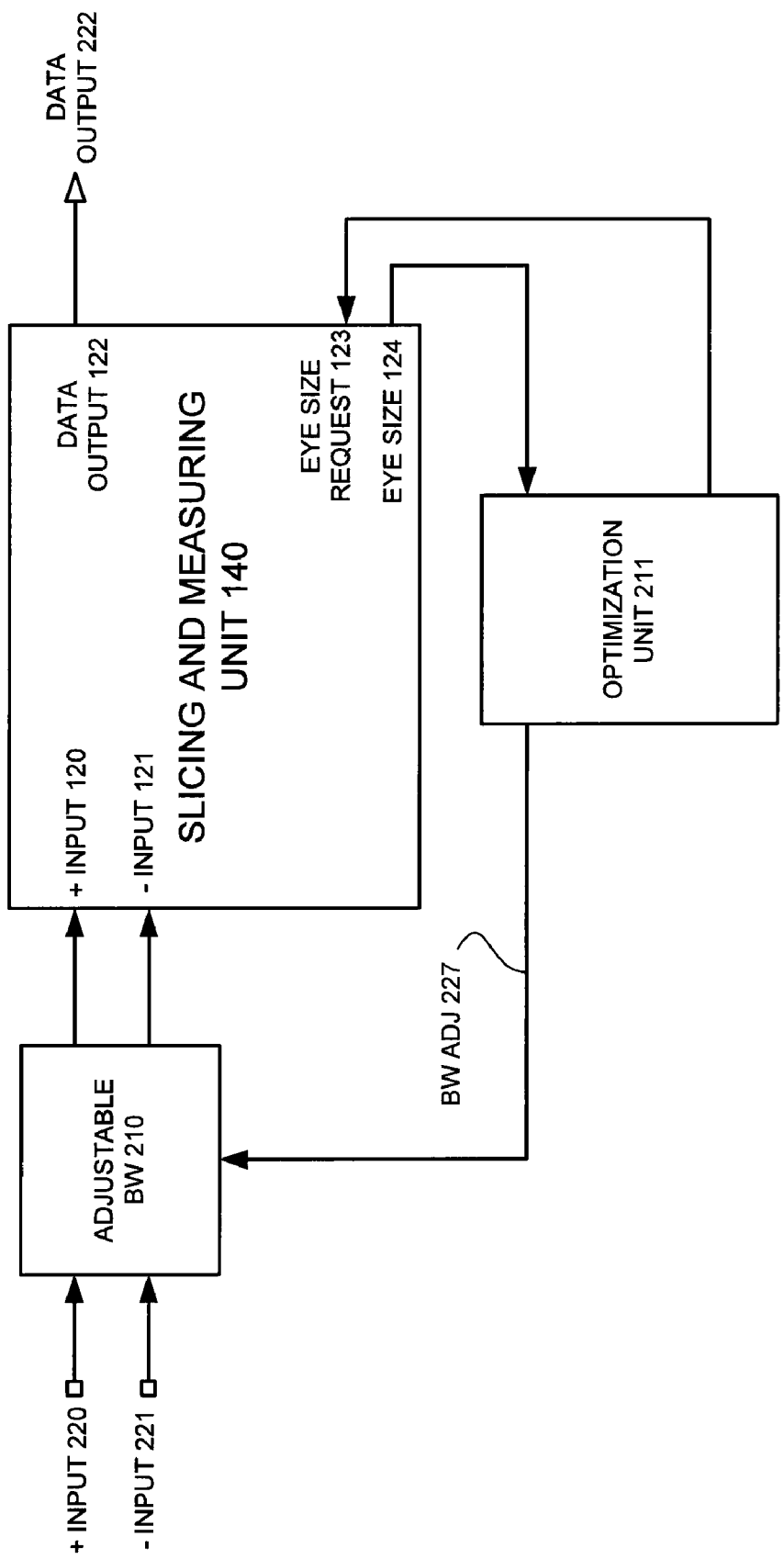
FIG. 4 depicts an example receiver incorporating a slicing and measuring unit 140.

An example hardware implementation for measuring eye opening size is depicted in FIG. 1A, which shows a slicing and measuring unit 140 that can be incorporated as part of a receiver in a data transmission system. FIG. 4 depicts an example receiver incorporating a slicing and measuring unit 140. FIG. 4 includes an optimization unit 211 and a unit called adjustable bandwidth 210. Adjustable bandwidth 210 is an adjustable LPF such that the bandwidth admissable to the receiver, from inputs 220 and 221 and passed to inputs 120 and 121 of unit 140, is adjustable. The hardware of FIG. 1A is described first, followed by the hardware of FIG. 4.

4.1. Slicing and Measuring Unit 140

The hardware of FIG. 1A operates as follows.

Data output 122 can be coupled to any receiving system that needs to make use of the received data. For example, the receiving system can be a backplane transceiver or a hard disk drive controller.

Figure 1B:
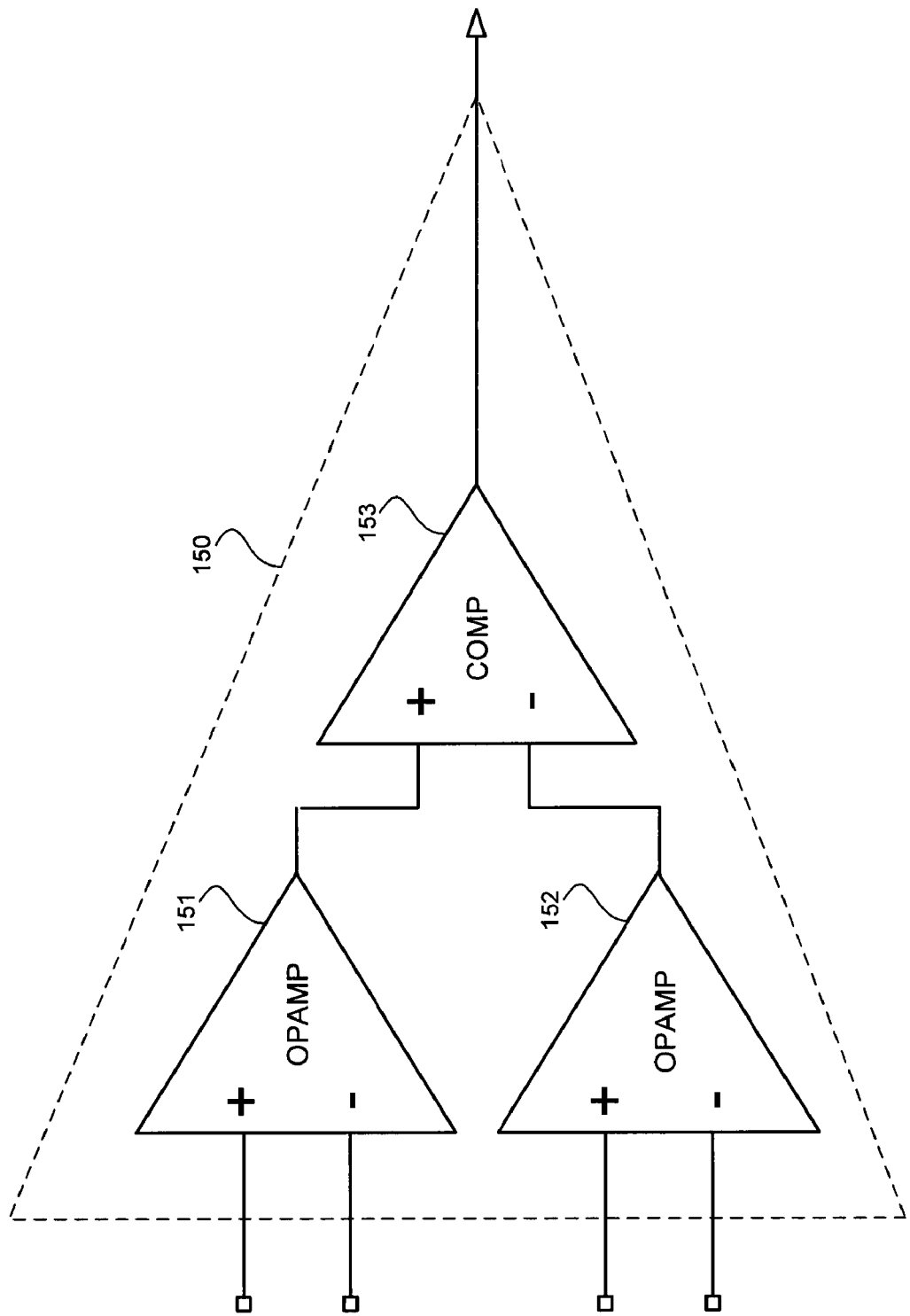
FIG. 1B depicts an implementation for a slicer.

Slicing and measuring unit 140 comprises a data slicer 110 and an auxiliary slicer 111. A functional overview, of how each of data slicer 110 and auxiliary slicer 111 can be implemented, is shown in FIG. 1B. FIG. 1B depicts a slicer 150 comprised of operational amplifier ("opamp") 151, opamp 152 and comparator 153. Each opamp converts a differential input of the slicer into a single-ended signal. Comparator 153 compares the outputs of the two opamps to produce a logical output.

It can be advantageous to integrate data slicer 110 and auxiliary slicer 111 on the same, physically contiguous, integrated circuit. Advantages include a close matching of electrical characteristics between the data slicer 110 and auxiliary slicer 111. Also, in high speed data receivers, it can be advantageous to locate those components that operate at high speeds (e.g., at speeds close to the received data rate) in close physical proximity and, preferably, on the same, physically contiguous, integrated circuit.

Slicing and measuring unit 140 receives the signal, whose eye opening is to be measured, at the following differential inputs: positive input 120 and negative input 121. Data slicer 110 compares differential inputs 120 and 121 to a differential reference 131 (e.g., a voltage source). Auxiliary slicer 111 compares differential inputs 120 and 121 to an adjustable differential reference 132 (e.g., a DAC, where the output is a digitally adjustable voltage).

Statistical engine 130 and eye measurement unit 133, together, can perform the functionality of the pseudocode of FIGS. 2B-2D.

It can be advantageous for statistical engine 130 to perform those tasks that require higher data processing speeds. It can also be advantageous to integrate statistical engine 130 on the same integrated circuit of data slicer 110 and auxiliary slicer 111. An example functionality for statistical engine 130 is the inner loop of FIG. 2C, lines 18-30. The inputs to statistical engine 130 from data slicer 110 and auxiliary slicer 111 can correspond to the functionality of "wait_for_symbol_clock" (see FIG. 2C, line 20) obtaining the values by which to set data_slicer_value and aux_slicer_value. SE control lines 125 permit eye measurement unit 133 to control statistical engine 130. SE control lines 125 can control, in eye measurement unit 133, functionality corresponding to the variable "eye_region" (FIG. 2C, line 21) that selects which eye edge to locate. SE result lines 126 can pass results determined by statistical engine 130 back to eye measurement unit 133. SE result lines 126 can provide information corresponding to the accumulated value of num_of_diffs (FIG. 2C, line 28).

Eye measurement unit 133 can perform functionality corresponding to the remaining pseudocode of FIGS. 2B-2D (i.e., the pseudocode of FIGS. 2B-2D, except for that portion of FIG. 2C that can be performed by statistical engine 130). Specifically, calling the procedure "measure eye opening" can correspond, in FIG. 1A, to the functionality of asserting input signal line "eye size request 123." measure_eye_opening returning "eye_size" can correspond, in FIG. 1A, to an eye opening size being provided on the output signal lines "eye size 124." The setting of aux_slicer_thresh, by the adjust_aux_slicer procedure, can correspond, in FIG. 1A, to outputting a new value to control DAC 132 on the signal lines "Thr Adj 127." The functionality of eye measurement unit 133 can all be integrated on the same integrated circuit with data slicer 110 and auxiliary slicer 111, or it can be advantageous to implement some, or all, of the functionality on separate hardware.

For example, it can be advantageous to implement the functionality of procedure adjust_aux_slicer on the same integrated circuit as data slicer 110 and auxiliary slicer 111.

As another example, it can be advantageous to implement the functionality of procedure measure_eye_opening on hardware separate from the integrated circuit implementing data slicer 110 and auxiliary slicer 111. It can be advantageous, for example, to implement the functionality of procedure measure_eye_opening with a separate, general purpose, microprocessor system programmed with appropriate software.

4.2. Example Optimizing Receiver

FIG. 4 depicts an example optimizing receiver that is a possible implementation for the functionality of the pseudocode of FIG. 3. Specifically, the pseudocode of FIG. 3 can be implemented by optimization unit 211 as follows.

The calling of the procedure measure_eye_opening (FIG. 3, lines 8 and 22) can correspond, in FIG. 4, to optimization unit 221 asserting the signal lines of eye size request 123 on the slicing and measuring unit 140.

The values returned by measuring_eye_opening, at lines 8 and 22 of FIG. 3, can correspond, in FIG. 4, to slicing and measuring unit 140 providing an eye opening size measurement on its signal lines eye size 124. The value output at eye size 124 is provided as an input to optimization unit 211.

The setting of receiver_bw (FIG. 3, lines 2 and 18) can correspond, in FIG. 4, to optimization unit 221 outputting a new value, to control the LPF of adjustable BW 210, on the signal lines "BW Adj 227."

Unit 210 (i.e. "adjustable BW 210"), is an adjustable LPF that receives the signal to be optimized at the following differential inputs: positive input 220 and negative input 221. After performing its filtering operation, unit 210 passes the received signal to the differential inputs of slicing and measuring unit 140.

As discussed above, data output 122, of slicing and measuring unit 140, can be coupled to any receiving system that needs to make use of the received data. Examples of receiving systems (also mentioned above), are a backplane transceiver or a hard disk drive controller.

5. Glossary of Selected Terms

DAC: Digital to Analog Converter.

Data slicer: Compares an input signal level to a threshold for purposes of identifying symbols of a data transmission stream. When used with a binary data stream, the data slicer can output either a one or a zero.

Auxiliary slicer: Compares an input signal level to an adjustable threshold and is used in conjunction with the data slicer. When used with a binary data stream, the auxiliary slicer can output either a one or a zero.

DSO: digital sampling oscilloscope.

DTS: data transmission system.

ISI: Inter-Symbol Interference.

LPF: Low Pass Filter.

PAM4: Pulse Amplitude Modulation, with 4 amplitude levels, for encoding symbols.

PR: pulse response.

Pseudocode: The pseudocode presented herein is loosely based on the C programming language. The C programming language is described in such texts as "A Book on C," by A. Kelley and I. Pohl, Benjamin Cummings Pub. Co., Third Edition, 1995, ISBN 0-8053-1677-9, herein incorporated by reference in its entirety.

SCE: symbol clock edge.

While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims and equivalents.

What is claimed is:

1. A method for adapting a receiver of a data transmission system which uses only two slicers to determine an eye opening, comprising:

supplying a signal to a single data slicer to compare the signal to the data slicer's fixed threshold for identifying symbols in a data transmission stream;

supplying the signal to a single auxiliary slicer to compare the signal to the auxiliary slicer's adjustable threshold for identifying an eye opening size for the signal;

determining a first eye opening size by adjusting the auxiliary slicer's threshold towards an upper edge and a lower edge of a first eye opening as a result of comparisons between the auxiliary slicer's output and the data slicer's output; and performing a first adjustment, in a first direction, to a first parameter of the receiver;

determining a second eye opening size, as a result of the first adjustment, by adjusting the auxiliary slicer's threshold towards an upper edge and a lower edge of a second eye opening as a result of comparisons between the auxiliary slicer's output and the data slicer's output;

comparing the first eye opening size to the second eye opening size to obtain a comparison result; and performing a second adjustment to the first parameter of the receiver in a direction dependent upon the comparison result.

2. The method of claim 1, further comprising:

continuing normal reception of data transmissions, from the data slicer, during determinations of an eye opening size.

3. The method of claim 1, further comprising performing the second adjustment by:

adjusting the first parameter in the first direction if the second eye opening size is greater than the first eye opening size and adjusting the first parameter in a second direction if the second eye opening size is less than the first eye opening size.

4. The method of claim 1, further comprising adjusting the auxiliary slicer's threshold towards an edge of an eye by:
obtaining a disagreement count by counting each disagreement between the data slicer's output and the auxiliary slicer's output when the data slicer indicates reception of a symbol of the edge of the eye;

comparing the disagreement count to a first threshold; and adjusting the auxiliary slicer's threshold as a result of comparing the disagreement count to the first threshold.

5. The method of claim 4, further comprising adjusting the auxiliary slicer's threshold towards an edge of an eye by:

adjusting the auxiliary slicer's threshold further from a center of an eye opening if the disagreement count is less than the first threshold; and adjusting the auxiliary slicer's threshold towards a center of an eye opening if the disagreement count is greater than the first threshold.

6. A system for adapting a receiver of a data transmission system which uses only two slicers to determine an eye opening, comprising:
- a sub-system to supply a signal to a single data slicer to compare the signal to the data slicer's fixed threshold for identifying symbols in a data transmission stream, and supply the signal to a single auxiliary slicer to compare the signal to the auxiliary slicer's adjustable threshold for identifying an eye opening size for the signal;
- a determination mechanism to determine a first eye opening size by adjusting the auxiliary slicer's threshold towards an upper edge and a lower edge of a first eye opening as a result of comparisons between the auxiliary slicer's output and the data slicer's output, and determine a second eye opening size, as a result of a first adjustment, in a first direction, to a first parameter of the receiver, by adjusting the auxiliary slicer's threshold towards an upper edge and a lower edge of a second eye opening as a result of comparisons between the auxiliary slicer's output and the data slicer's output;
- a comparison mechanism to compare the first eye opening size to the second eye opening size to obtain a comparison result; and
- an adjustment mechanism to perform the first adjustment, in the first direction, to the first parameter of the receiver, and perform a second adjustment to the first parameter of the receiver in a direction dependent upon the comparison result.

7. A method for adapting a receiver of a data transmission system to determine an eye opening, comprising:
- receiving a signal, which is associated with a data transmission stream, at a low-pass filter (LPF) whose bandwidth is adjustable;
- supplying an output signal of the LPF to a data slicer and an auxiliary slicer;
- determining a first eye opening size by comparing the auxiliary slicer's output to the data slicer's output and adjusting the auxiliary slicer's threshold accordingly;
- performing a first adjustment, in a first direction, to the LPF's bandwidth, thereby changing the output signal's eye opening size;
- determining a second eye opening size, as a result of the first adjustment, by comparing the auxiliary slicer's output to the data slicer's output and adjusting the auxiliary slicer's threshold accordingly;
- comparing the first eye opening size to the second eye opening size to obtain a comparison result; and
- performing a second adjustment, to the LPF's bandwidth, in a direction dependent upon the comparison result.

8. A system for adapting a receiver of a data transmission system to determine an eye opening, comprising:
- a low-pass filter (LPF) whose bandwidth is adjustable, and which receives a signal associated with a data transmission stream;
- a sub-system to supply an output signal of the LPF to a data slicer and an auxiliary slicer;
- a determination mechanism to determine a first eye opening size by comparing the auxiliary slicer's output to the data slicer's output and adjusting the auxiliary slicer's threshold accordingly, and determine a second eye opening size, as a result of a first adjustment, in a first direction, to the LPF's bandwidth, by comparing the auxiliary slicer's output to the data slicer's output and adjusting the auxiliary slicer's threshold accordingly;
- a comparison mechanism to compare the first eye opening size to the second eye opening size to obtain a comparison result; and
- an adjustment mechanism to perform the first adjustment, in the first direction, to the LPF's bandwidth, and perform a second adjustment, to the LPF's bandwidth, in a direction dependent upon the comparison result.

* * * * *